US008046619B2

(12) United States Patent
Newland et al.

(10) Patent No.: US 8,046,619 B2
(45) Date of Patent: Oct. 25, 2011

(54) APPARATUS AND METHODS FOR DATA DISTRIBUTION DEVICES HAVING SELECTABLE POWER SUPPLIES

(75) Inventors: Paul Benjamin Newland, Middletown, NJ (US); Daniel Goodman, New York, NY (US); Wolf-Dieter Gross, Rodgau (DE); Stuart D. Conklin, Sparta, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1417 days.

(21) Appl. No.: 11/541,788

(22) Filed: Oct. 3, 2006

(65) Prior Publication Data
US 2009/0073957 A1    Mar. 19, 2009

(51) Int. Cl.
*G06F 1/26* (2006.01)
(52) U.S. Cl. .......................................... 713/340; 710/16
(58) Field of Classification Search .................. 713/340; 710/16
See application file for complete search history.

(56) References Cited

U.S. PATENT DOCUMENTS

| | | | |
|---|---|---|---|
| 6,473,608 B1 | 10/2002 | Lehr | |
| 7,203,849 B2 * | 4/2007 | Dove | 713/300 |
| 7,337,336 B2 | 2/2008 | Ferentz | |
| 2005/0080516 A1 | 4/2005 | Pincu | |
| 2008/0168283 A1 * | 7/2008 | Penning | 713/310 |

FOREIGN PATENT DOCUMENTS

| | | |
|---|---|---|
| WO | WO 2005/071885 | 8/2005 |
| WO | WO 2005/109154 | 11/2005 |

OTHER PUBLICATIONS

Mar. 12, 2010, Office Action from Canadian Application No. 2,615,570.
Feb. 2, 2010, Office Action from U.S. Appl. No. 11/649,913.
Aug. 20, 2009, Office Action from U.S. Appl. No. 11/649,913.

* cited by examiner

*Primary Examiner* — Albert Wang
(74) *Attorney, Agent, or Firm* — Muncy, Geissler, Olds & Lowe, PLLC (57) ABSTRACT

A network apparatus includes an independent power supply providing a first power signal, and a data distribution device which is operably coupled to the independent power supply and a remote data distribution device, where the remote distribution data device exchanges data and provides a second power signal to the data distribution device, and further where the data distribution device selects the first power signal or the second power signal for operational power. A method includes scanning a plurality of sensors, each coupled to a plurality of power inputs, to ascertain if a power signal is present, determining whether a power signal associated with an independent power supply is present at a power input, sourcing power from the independent power supply if the power signal is associated with an independent power supply, and sourcing power from an alternative supply if the power signal is not associated with an independent power supply.

30 Claims, 4 Drawing Sheets

APPARATUS AND METHODS FOR DATA DISTRIBUTION DEVICES HAVING SELECTABLE POWER SUPPLIES

BACKGROUND OF THE INVENTION

1. Field of the Invention

Embodiments of the invention generally relate to the power management of networking devices, and more particularly, networked data distribution devices having a plurality of selectable power supplies. Additional embodiments are directed to utilizing such data distribution devices in conjunction with Voice over Internet Protocol (VOIP) telephones.

2. Description of the Background Art

The IEEE Power over Ethernet (PoE) standard 802.3af may increase the flexibility and capability of existing Ethernet networks by providing power over the same connection media which is use to exchange data. Because PoE may provide power in a reliable manner over the same cables as data, it can improve the flexibility of the placement of network devices, which may be useful for various network devices, such as, for example, Voice over Internet Protocol (VoIP) telephones. Additionally, when the PoE source is supplemented with a UPS as a power backup, PoE may be able to permit a network device to function during an AC power outage, which may be especially useful for VoIP telephones in emergency situations. However, problems can arise if the PoE source is overburdened by too many devices drawing more current that the PoE supply can provide, or when one or more devices malfunction and draw too much power. This can cause the PoE source to malfunction and may reduce device and network system reliability.

In a related area of endeavor, rapid advances in network technology have provided the opportunity for commodity network devices, such as, for example, personal computers, Ethernet switches, routers, etc., to communicate over networks using gigabit rates. This may present bottlenecks in the network as other legacy hardware, such as, for example, VoIP telephones, may not be able to switch data to downstream devices at gigabit rates. The performance of some legacy network devices may not be improved with high speed data rates, and moreover, such hardware may be expensive to upgrade. Therefore simply replacing the legacy hardware may not be an economical solution to network bottlenecks.

Accordingly, there is a need for devices and methods which economically address network bottlenecks, and have the ability to select power from a plurality of power sources to improve reliability and ease power consumption over PoE sources.

SUMMARY OF THE EMBODIMENTS

Various embodiments of the invention are presented herein which can address the abovementioned issues associated with the existing technology. Embodiments consistent with the present invention are directed to methods and apparatuses for data distribution devices having selectable power supplies. One embodiment consistent with the present invention is directed to a network apparatus which receives power from a plurality of power sources. The network apparatus includes an independent power supply providing a first power signal, and a data distribution device which is operably coupled to the independent power supply and a remote data distribution device, where the remote distribution data device exchanges data with, and provides a second power signal to, the data distribution device using a common connection, and further where the data distribution device selects either the first power signal or the second power signal for operational power.

Another embodiment consistent the present invention is directed to a network switch which interfaces with a Voice over Internet Protocol (VoIP) telephone. The network switch includes a first circuit which exchanges data and receives power from a remote data distribution device, a second circuit which exchanges data and supplies power to the VoIP telephone, a third circuit which exchanges data with a networked based device, a power switching circuit which receives power from an independent power supply and from the first circuit, and a controller, functionally coupled to the power switching circuit, which instructs the power switching circuit to select power from either the first circuit or the independent power supply.

Another embodiment consistent with the present invention is directed to a method for selecting a power source for a network switch. The method includes scanning a plurality of sensors, each coupled to a plurality of power inputs, to ascertain if a power signal is present, determining whether a power signal associated with an independent power supply is present at a power input, sourcing power from the independent power supply if the power signal is associated with an independent power supply, and sourcing power from an alternative supply if the power signal is not associated with an independent power supply.

Yet another embodiment consistent the present invention is directed to an adapter interface for connecting a network device to a midspan or endspan product. The adapter interface includes a power over Ethernet (PoE) controller generating a first power signature for transmission to the midspan or endspan product, wherein the first power signature represents a request for a first power level and does not depend upon the value or presence of any other power signature request received by the adapter interface from the network device.

Another embodiment consistent the present invention is directed to an adapter interface for connecting at least two devices to an endspan or midspan product. The adapter interface includes a Power over Ethernet (PoE) controller generating a first power signature for transmission to the endspan or midspan product, wherein the first power signature represents a request for a first power level, a first port for providing power to a first device of the at least two devices, and a second port for providing a communication path to a second device of the at least two devices.

BRIEF DESCRIPTION OF THE DRAWINGS

Further aspects and advantages of the present invention will become apparent upon reading the following detailed description taken in conjunction with the accompanying drawings summarized below.

DETAILED DESCRIPTION

Embodiments consistent with the present invention are more specifically set forth in the following description with reference to the appended figures. Wherever possible, the same reference numbers will be used throughout the drawings to refer to the same or like parts.

Figure 1:
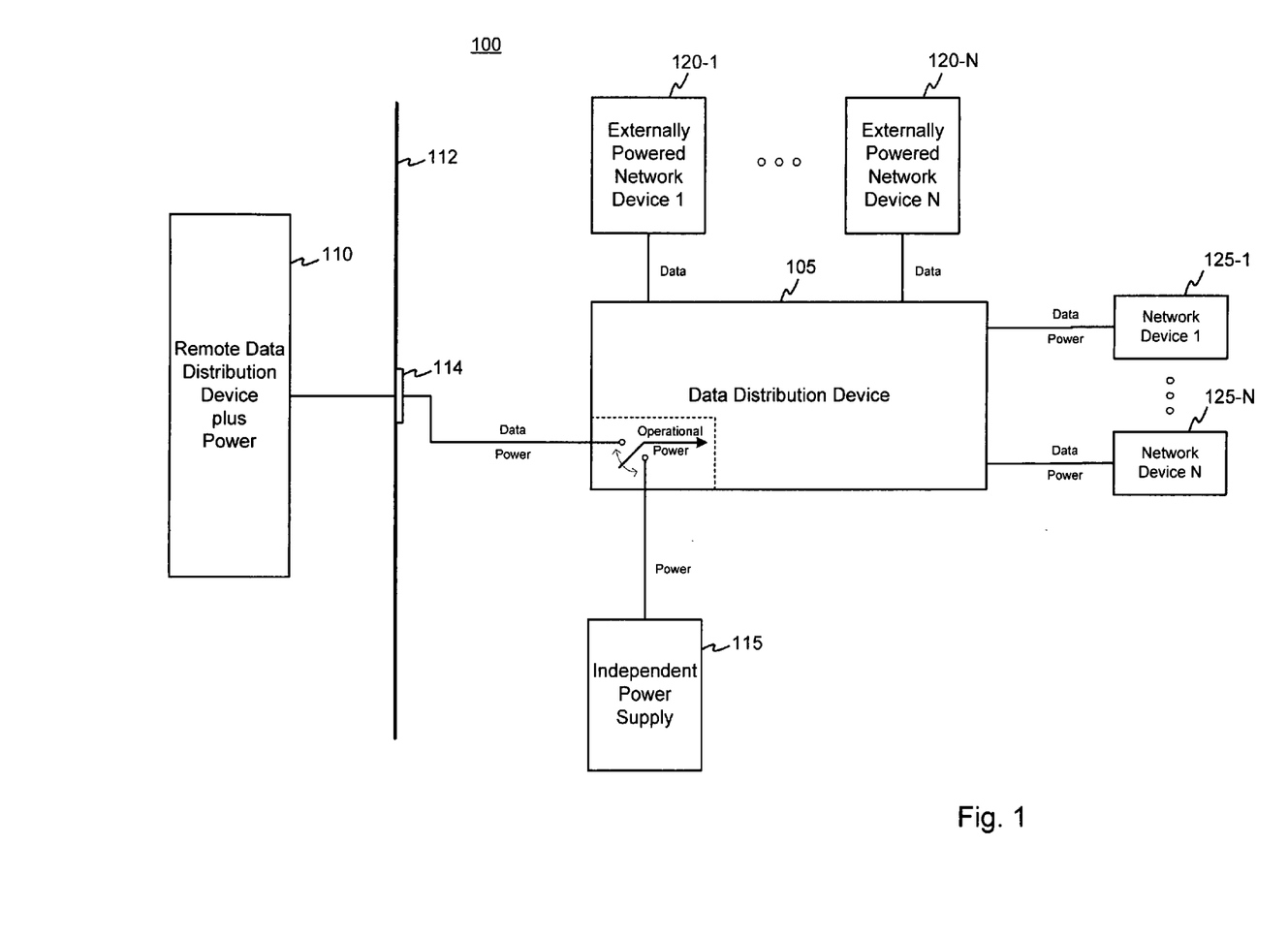
FIG. 1 shows an exemplary top-level block diagram of a data distribution device having alternate power supplies consistent with an embodiment of the invention.

FIG. 1 shows an exemplary configuration 100 including a data distribution device having a plurality power supplies consistent with an embodiment of the invention. Configuration 100 may include a data distribution device 105, an independent power supply 115, a remote data distribution device 110, one or more network devices 125-1-125-N, and one or more externally powered network devices 120-1-120-N.

Data distribution device 105 may exchange data with remote data distribution device 110 over a connection through a wall plate 114. Wall plate 114 may be physically attached to wall 112, and may typically be in local proximity to data distribution device 105 and remote proximity power from independent power supply 115. Additionally, operational power for the data distribution device 105 may be provided by remote data distribution device 110 over the same connection used for data through wall plate 114. Alternately, data distribution device 105 may select power over a dedicated power line connected to independent power supply 115. Data distribution device may make this selection using an internal switch, the details of which are presented below. Data distribution device 105 may also exchange data with one or more externally powered network devices 120-1-120-N and with one or more network device 125-1-125-N. Typically, data distribution device 105 may not provide power to externally powered network devices 120-1-120-N. Data may be exchanged may with other devices and/or networks through remote data distribution device 110, or may be exchanged with other devices directly connected to data distribution device 105. Additionally, data distribution device 105 may provide power to one or more network device 125-1-125-N over the same connection used to exchange data. This power originates from the power source data distribution device 105 has selected. Moreover, data distribution device 105 may sense the amount of power required by one or more network devices 125-1-125-N, and provide power accordingly.

Data distribution device 105 may be any type of network device for distributing data using any physical networking standards and data communication protocols, including, for example, Ethernet and TCP/IP. Data Distribution device 105 may be a switch, a hub, a router, a patch panel, or any other type of network device known by one of ordinary skill in the art. Data distribution device 105 may exchange data with remote data distribution device 110, externally powered network devices 120-1-120-N, and/or network devices 125-1-125-N using any known physical networking standards and data communication protocols, including, for example, Ethernet and/or TCP/IP. Data distribution device 105 may exchange data utilizing standard Ethernet cables and connectors, such as, for example, CAT5/5e, and/or CAT6 cabling, in conjunction with, for example, standard RJ-45 connectors. Data distribution device may operate at 10/100/1000 Mbit/sec data rates for data exchange, and thus, for example, may serve as a so called gigabit switch.

Data distribution device may select from one of a plurality of power supplies to supply its own internal power, and/or to supply power to one or more network devices 125-1-125-N. This switching may be performed using relays, transistors, or any other known switching devices. Details of one hardware switching approach are presented below in the description of FIG. 3. For sake of clarity, only two sources of power are illustrated in FIG. 1. As shown, data distribution device 105 may select power from independent power supply 115 or from remote data distribution device 110. This selection may be based upon pre-defined logic rules within data distribution device 105, and can be based upon the source of incoming power and/or the maximum available power from each power source. For example, if only one source of power is present, then data distribution device 105 will utilize that source for internal power. If both remote data distribution device 110 and independent power supply 115 are supplying power, logic within data distribution device may switch to using power from independent power supply 115 to reduce the power draw from remote data distribution device 110, as it may be powering other devices over other Power over Ethernet (PoE) network connections (not shown). Additionally, data distribution device 105 may provide the appropriate feed-back to remote data distribution device 110 as to how much power it needs to allocate and/or offer to data distribution device 105. This may be done, for example, using known IEEE 802.3af techniques by having data distribution device 105 present the appropriate resistive signature to remote data distribution device 110 based upon which power supply was selected. This signature may be in accordance with signatures associated with any class prescribed by 802.3af, including Class 0, 1, 2, and/or 3 power signatures. Data distribution device 105 may obtain power from remote data distribution device 110 operating in any configuration, including midspan and endspan configurations, associated with PoE under IEEE 802.3af. Using the selected power supply, data distribution device 105 can subsequently provide power for network devices 125-1-125-N, if present.

Independent power supply 115 may supply power to data distribution device 105 using either standard or customized cabling and connectors. Remote data distribution device 110 may supply power using the same physical medium used to exchange data. Power may be delivered over the physical data connection media using any technique known to one of ordinary skill in the art. Such techniques include, for example, techniques and configurations which comply with the IEEE 802.3af Power over Ethernet (PoE) standards, or any other power over data line techniques know in the art.

Data distribution device 105 may in turn provide power to network devices 125-1-125-N over the same physical media used to exchange data, and may use IEEE 802.3af PoE standards, or any other power over data line techniques know in the art. In accordance with the 802.3af standard, data distribution device 105 may first sense how much power network devices 125-1-1225-N require for proper operation, and allocate and/or offer power in accordance with the sensed requirements. Techniques used to sense the power requirements are known and may be defined according to IEEE 802.3af standards, and may include Class 0, 1, 2, and/or 3 power signatures. Moreover, data distribution device may provide a different power signature to remote distribution device 110 than it receives from one or more network devices 125-1-125-N. Furthermore, the power signature which may be provided by the data distribution device to the remote data distribution device 110 may not depend upon the value or presence of any other power signature request received by the data distribution device 105 from one or more network devices 125-1-125-N.

Remote data distribution device 110 may be any type of network device for distribution data (e.g., a switch, a hub, a router, and/or a patch panel, etc.) using any known physical networking standards and data communication protocols, including, for example, Ethernet and/or TCP/IP Typically, remote data distribution device may be housed in a dedicated enclosure (such as, for example, a "closet"), and be used for a high speed communications (such as, for example, gigabit Ethernet), to serve as an interchange between upstream data communications with other networks and/or network devices (such as, for example, other local area networks, wide area networks, and/or the Internet, possibly through other external switches, routers, firewalls, patch panels, and/or hubs, etc., which are not shown in FIG. 1), and downstream data communication with plurality of downstream network devices (e.g., externally powered network devices 120-1-120-N and/or network devices 125-1-125-N) through data distribution device 105. Remote data distribution device 110 may have one or more dedicated power sources (not shown). Remote data distribution device 110 may have a main power source, such as a standard power source driven by AC wall power, or other standard power supplies known in the art. Remote data distribution device 110 may also include one or more backup power sources for redundancy or emergency purposes, such as for example, an uninterruptible power supply, which may include generator and/or battery backup, and/or any other type of backup known to those skilled in the art.

Remote data distribution device 110 may interface with other devices to deliver power utilizing the same physical connection media for which data is exchanged. Typically, the physical connection media may be standard Ethernet cables and connectors (such as, for example, CAT5, CAT5e, and/or CAT6 cabling, using, for example, standard RJ-45 connectors). Power may be delivered over the physical connection media using any technique known to one of ordinary skill in the art. Such techniques include, for example, techniques and configurations which comply with the IEEE 802.3af Power over Ethernet (PoE) standards, which include sensing the power requirements of any downstream device requiring power (for example, data distribution device 105) and allocating and/or offering power in accordance with the sensed requirements. Such requirements may be defined according to IEEE 802.3af standards, and may include Class 0, 1, 2, and/or 3 power signatures.

Independent power supply 115 may be any type of power supply known in the art, and can include, for example, AC/DC power converters (such as, for example, so called "wall warts"), DC/DC power converters, switching power supplies, battery power supplies, and/or capacitive power supplies, etc.). While only one independent power supply is shown, one of ordinary skill in the art would appreciate that various embodiments of the invention could include more than one independent power supply. Independent power supply 115 may interface with data distribution device 105 using any method known in the art, including standard and/or custom power cables and connectors.

Network Devices 125-1-125-N may be any type of networkable device known in the art, using any known physical networking standards and data communication protocols, including, for example, Ethernet and TCP/IP. Network devices 125-1-125-N may exchange data using 10/100/1000 Mbit/sec rates using known cabling and connectors (such as, for example, CAT5, CAT5e, and/or CAT6 cabling, using, for example, standard RJ-45 connectors), and may receive operational power supplied by data distribution device 105 using the same cabling and connectors which are used for data exchange. Power may be supplied using any known methods, included IEEE 802.3af PoE. Network devices 125-1-125-N may include Voice over Internet Protocol (VoIP) telephones, video cameras, still cameras, wireless access points, and/or remote telemetry data collection devices.

Externally powered network devices 120-1-120-N may be any type of networkable device known in the art, using any known physical networking standards and data communication protocols, including, for example, Ethernet and TCP/IP. Network devices 125-1-125-N may exchange data using 10/100/1000 Mbit/sec rates using known cabling and connectors (such as, for example, CAT5, CAT5e, and/or CAT6 cabling, using, for example, standard RJ-45 connectors). Externally powered network devices 120-1-120-N may not receive power directly from data distribution device 105, but will have power supplied to them through an external power supply which is not associated with data distribution device 105. Externally powered network devices 125-1-125-N may include personal computers, workstations, and/or laptops, routers, switches and/or hubs.

Figure 2A:
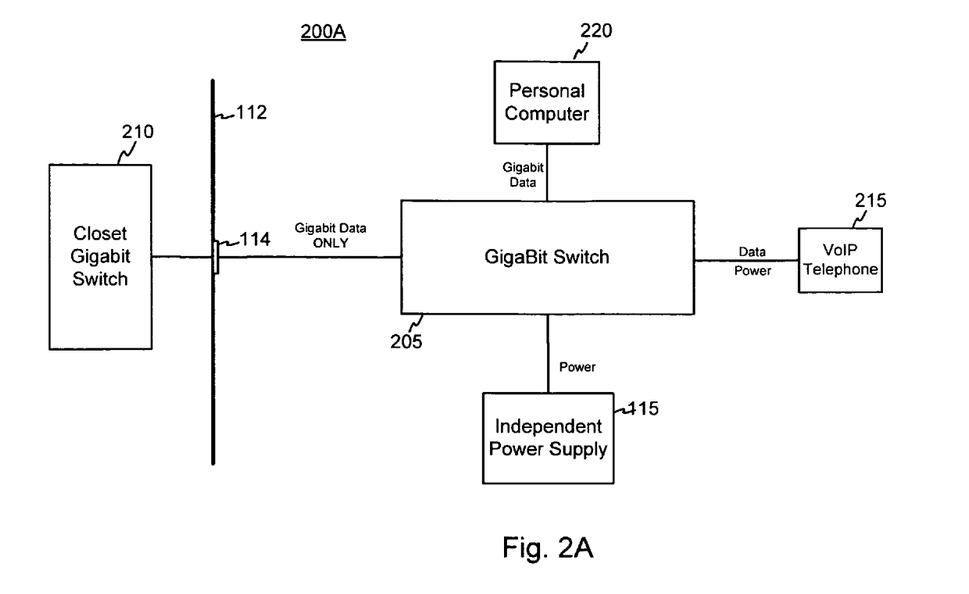
FIGS. 2A and 2B depict exemplary block diagrams of a gigabit Ethernet switch having selectable power supplies for use with VoIP telephones consistent with another embodiment of the invention.

FIG. 2A depicts a gigabit Ethernet switch having selectable power supplies for use with VoIP telephones in a configuration 200A having an independent power supply. This configuration includes a closet gigabit switch 210, a Gigabit switch 205, an independent power supply 115, a personal computer 220, and a VoIP telephone 215. All of the data communications within this embodiment may utilize Ethernet and TCP/IP communication protocols.

In configuration 200A, gigabit switch 205 exchanges data over an Ethernet connection, through wall plate 114, with closet gigabit switch 210. Wall plate 114 may be mounted wall 112 which may be proximately located to gigabit switch 205, and distally located to closet gigabit switch 210. Closet gigabit switch 210 can serve a number of other connected devices throughout a network with data and power using IEEE 802.3af PoE (not shown). Gigabit switch 205 may further exchange data with personal computer 220, and with VoIP telephone 215. In one embodiment, gigabit switch 205 may exchange data with personal computer 220 and closet gigabit switch 210 at higher data rates, such as, for example, 1000 Mbps. Data exchanged between gigabit switch 205 and VoIP telephone 215 may occur at lower rates, such as, for example, 10/100 Mbps.

Because the independent power supply 115 is present in this configuration, gigabit switch 205 may sense power present at independent power supply 115 and select power from this source for use as operational power, and may not select PoE power from closet gigabit switch 210. Additionally, gigabit switch 205 may initially determine how much power VoIP telephone 215 requires using standard 802.3af sensing techniques, and subsequently supply power to VoIP telephone 215 using standard 802.3af PoE.

Figure 2B:
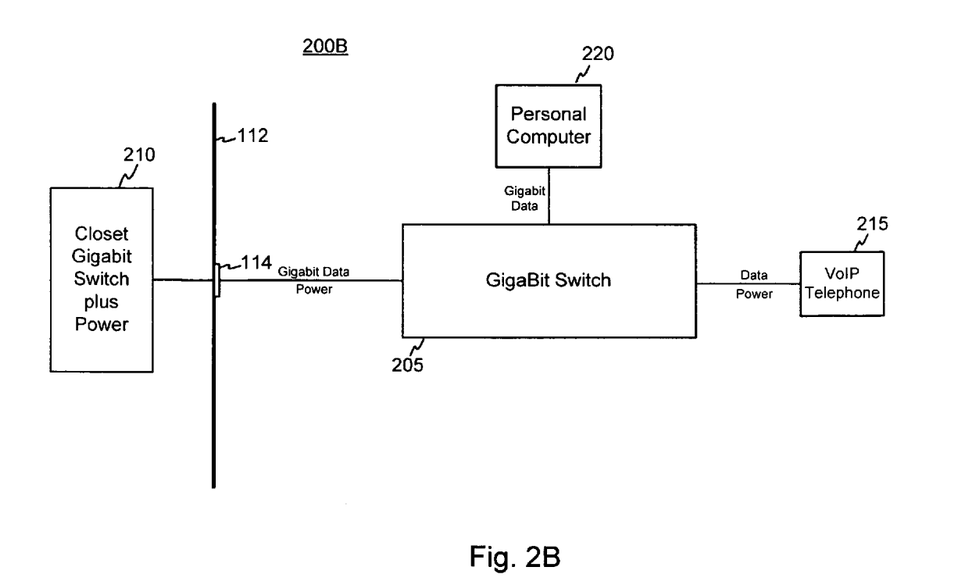

FIG. 2B depicts another configuration 200B of gigabit switch 205 which does not have an independent power supply connected thereto. Here, gigabit switch 205 would not sense power coming from the independent power supply, and would then select power from closet gigabit switch 210. Upon initialization, closet gigabit switch can determine how much operation power gigabit switch 210 requires utilizing 802.3af techniques, and allocate and supply the appropriate power amount over the same physical connection used for exchanging data. As described above, gigabit switch 205 can in-turn provide power to VoIP telephone 215 using 802.3af, PoE as described above, however, in configuration 200B, the power would be sourced from closet gigabit switch 210. As described above gigabit switch 205 may initially determine how much power VoIP telephone 215 requires using standard 802.3af sensing techniques, and subsequently supply the requested power thereto. The operation of gigabit switch 205 with respect data communication would be the same as described above for configuration 200A shown in FIG. 2A. One of ordinary skill in the art would appreciated that configuration 200B may also include the case where independent power supply 115 is present, but for whatever reason(s), is not providing power to gigabit switch 205. In this case, power from closet gigabit switch 210 may serve as backup power for the independent power supply.

One practical advantage of configurations 200A and 200B is that they can permit high speed network communications with PC 220, while permitting the user to maintain the use of existing VoIP telephones which may have an internal switches operating at lower bit rates. This permits high speed communications for PC 220 through a relatively inexpensive upgrade by adding gigabit switch 205, while preserving the investment in the existing, slower speed VoIP telephone 215. In other words, this allows the user to upgrade PC 220, while avoiding having to upgrade to a relatively more expensive VoIP telephone having a high speed internal switch.

A practical advantage of gigabit switch 205 having the capability of selecting different power supplies is that it affords greater operational reliability to VoIP telephone 215. For example, independent power supply 115 may be utilized if closet gigabit switch 210 does not offer PoE, or in the event its PoE capabilities are overburdened by other connected devices. Also, independent power supply may be provided as a battery backup by the user in the event close gigabit switch 210 has a failure and cannot supply PoE.

Figure 3:
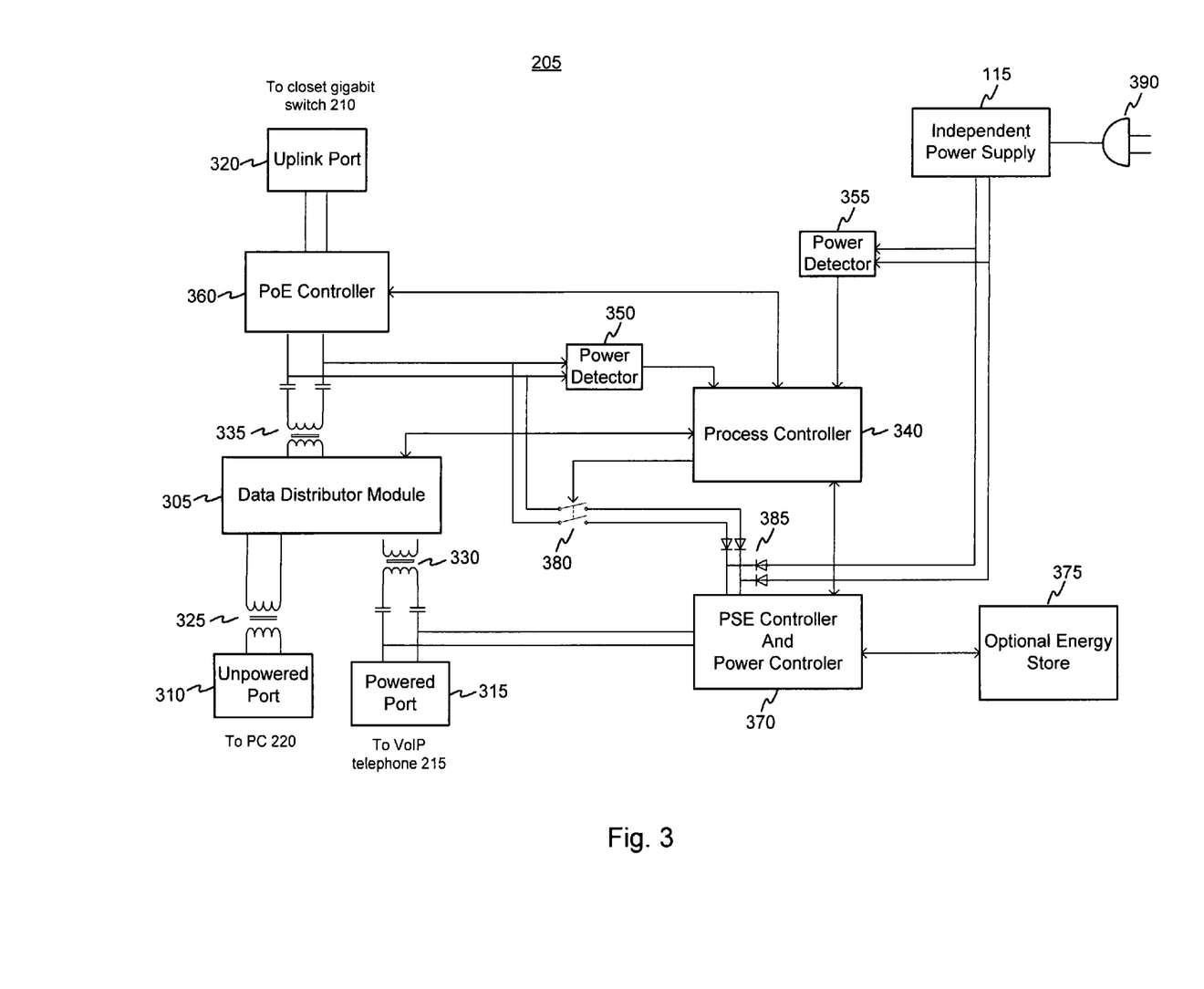
FIG. 3 shows an exemplary detailed block diagram of a data distribution device consistent with an embodiment of the invention.

FIG. 3 shows a further detail of gigabit switch 205 consistent with an embodiment of the invention. Gigabit switch 205 may exchange data through uplink port 320, unpowered port 310, and powered port 315. These ports may be any type of data port known in the art, and can include, for example, RJ-45 connectors. Data exchanged through uplink port 320 may originate from closet gigabit switch 210 and may operate at lower and higher data rates, such as, for example, 10/100/1000 Mbps. One of ordinary skill in the art would appreciate that closet gigabit switch 210 may be any type of data distribution device. Once presented at uplink port 320, data from closet switch 210 may pass through PoE controller 360 and then through an impedance matching circuit 335, and then onto data distributor module 305. Data exchanged through unpowered port 310 may originate from personal computer 220 which may also operate at lower and higher data rates, such as, for example, 10/100/1000 Mbps. One of ordinary skill in the art would appreciate that personal computer 220 may be any type of network based device. Once presented at uplink port 310, data from personal computer 220 may then pass through an impedance matching circuit 325 prior to being exchanged with data distributor module 305. Data exchanged through powered port 315 may originate from VoIP telephone 215 which may operate at lower data rates, such as for example, 10/100 Mbps. One of ordinary skill in the art would appreciate that VoIP telephone may also be any type of networked device. Once presented at powered port 315, data from VoIP telephone 215 may pass through an impedance matching circuit 330 and then onto data distributor module 305.

Data distributor module 305 may serve as an Ethernet switch which directs packets based upon their, MAC addresses and various routing tables and/or rules. Additionally, Data Distributor module 305 may also implement the features of a so called Multi-Layer Switch, and provide routing based on VLANs and the IP addresses themselves. A process controller 340 may provide one or more control signals to data distributor module for purposes configuration and operating parameters, either at initialization time or during the course of normal operation of the system. Data distributor module 305 may take the form of an integrated circuit and be any type of data distributor module known in the art, including multi-port gigabit Ethernet switch controllers.

Process controller 340 may also receive signals from power detectors 350 and 355 which may indicate a source of power, and based upon these signals, process controller may select a power source through switch 380. Power detectors may be either voltage or current detectors, and may be of any appropriate type known to one of ordinary skill in the art. Over uplink port 320, power may be received using IEEE 802.3af PoE standards, which can be supplied by closet gigabit switch 210. If power is present at this port, power detector 350, which may connected to outputs coming from PoE controller 360, will sense the power signal from uplink port 320, and send a signal notifying process controller 340 that the closet gigabit switch 210 is providing a power signal. Similarly, power detector 355 may sense a power signal provided by independent power supply 115, which may be fed power through standard A/C wall socket over plug and connector 390. Power sensor 355 will then send a signal to process controller 340 that independent power supply 115 is providing a power signal which may be used for operational power. As discussed above, independent power supply could be any known power source, and additional independent power supplies may be utilized, along with additional power sensors, to accommodate additional power supply sources.

Process controller 340 may then exercise various logic to determine which power supply to select. Such logic may be in the form of a program stored in on-board memory (not shown) within the process controller. Process controller and memory may be of any type known to one of ordinary skill in the art, and include. One form of logic which may be used could be to have process controller 340 use either PoE power from uplink port 320, or power from independent power supply 115, if only one of which is present. If both are sources are present, process controller 340 may select power from independent power supply 115 in order to minimize any aggregate PoE power draw closet gigabit switch 210 may experience. Details of the logic which may be used in this embodiment are further presented below in the description of FIG. 4. One of ordinary skill in the art would appreciate that other logic schemes may be used in accordance with the invention.

Once process controller 340 determines which power supply to select, the selection may occur by process controller 340 sending a command signal to switch 380. Switch 380 may be a relay, one or more transistors, or any other type of switch which may be controlled by an electronic signal. If process controller 340 selects independent power supply 115, it may open switch 380 so that current flows through a diode assembly 385 to a Power Sourcing Equipment (PSE) controller and Power Controller 370, hereinafter referred to as PCPC 370. If process controller 340 selects PoE power over uplink port 320, process controller 340 may close switch 380, and current from uplink port 320 will flow through diode assembly 385 into PCPC 370. Note that the voltage of independent power supply 115 may be chosen so, that if the independent power supply 115 is present and providing power, the appropriate diodes are back-biased, allowing current to flow from uplink port 320 into PCPC 370, and blocking current from independent power supply 115.

Process controller 340 may provide a signal to PoE controller 360 in order to provide feedback to closet gigabit switch 210 regarding how much power to allocate and supply to gigabit switch 205. PoE controller 360 may set up a signature resistance in accordance with IEEE 802.3af, to signal a class 0, 1, 2, and/or 3 power signatures. The signature resistance may be sensed by closet gigabit switch 210 during initialization so the appropriate amount of power is provided to gigabit switch 205. Moreover, close gigabit switch 210 may provide power in any configuration permitted under 802.3af, including, but not limited to endspan and/or midspan configurations. PoE controller 360 may take the form of an integrated circuit, or any other form known to one of ordinary skill in the art. The PoE controller may signal the process controller various conditions, which may include normal status, overload, instability of voltage source, voltage sag and others. Additionally, the process controller may calculate the total power needed by Switch 205 and provide that information to the PoE Controller 360 so that the PoE Controller 360 may report that information back to the closet switch in accordance with IEEE 802.3af or any other appropriate standards.

Process controller 340 may also provide control signals to PCPC 370 which may include instructions for providing the appropriate amount of power to VoIP telephone 215. Initially, PCPC 370 may first sense the power VoIP telephone 215 is requesting by measuring the signature resistance presented at powered port 315 by VoIP telephone 215. This may be done in accordance with PoE standard 802.3af. Once the power signature is requested, which may be class 0, 1, 2, or 3, process controller 340 may instruct the power controller in PCPC 370 to provide powered port 315 with the appropriate amount of power for use by VoIP telephone 215. This power may be provided over powered port 315 using PoE. The PSE controller may collect requested powering information from the device (215) connected to powered port 315 and report that information to Process Controller 340 for various purposes, including to report back to the closet switch 210 via PoE Controller 360 for power of switch 205.

In addition to receiving power from either uplink port 320 via closet gigabit switch 210 or independent power supply 115, PCPC 370 may also receive initialization power from optional energy store 375. Optional energy store 375 provides initialization power to gigabit switch 250 for a short period of time so that it may perform the power supply selection. Because only a small amount of power needs to be provided for a short period of time (for example, on the order of milliseconds), optional energy source does not have to supply a large amount of energy, and can take the form of a battery, a capacitor, or any other appropriate storage device known in the art.

Figure 4:
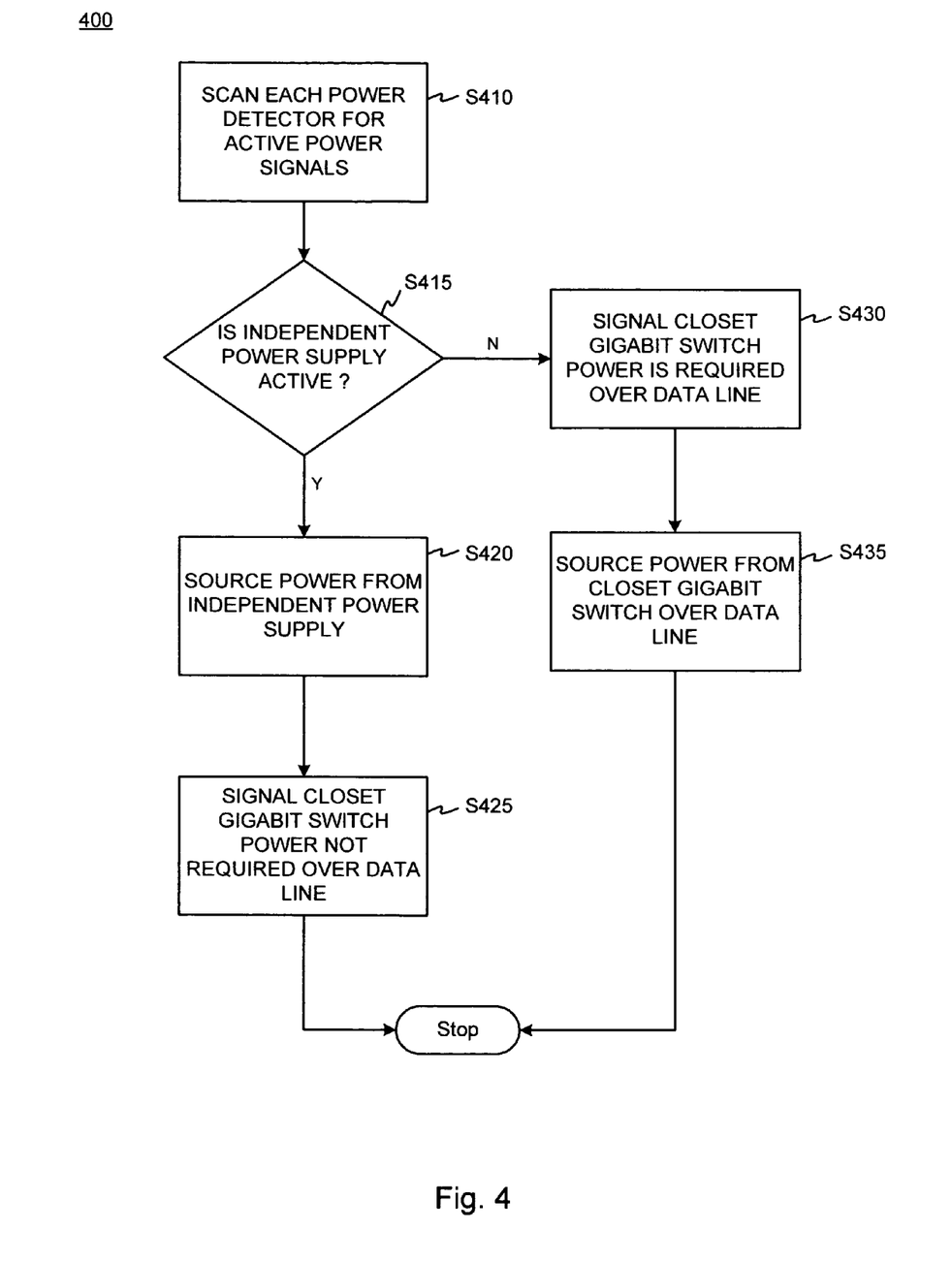
FIG. 4 depicts an exemplary flow diagram consistent with an embodiment of the invention.

FIG. 4 depicts logic flow 400 consistent with an embodiment of the invention. This diagram shows an exemplary sequence gigabit switch 205 may execute in order to select a power supply. This logic sequence may assume that an administrator's overall power management strategy for a network is to minimize the power draw from closet gigabit switch 210, and have independent power supply 115 selected whenever its power signal is detected, so other devices connected to closet gigabit switch 210 may benefit from sourcing power utilizing PoE. One of ordinary skill in the art would appreciate other logic sequences may be performed to accomplish other power management strategies. One of ordinary skill in the art would also appreciate that, since a power supply has yet to be selected, the logic 400 would be accomplished by the components in gigabit switch 205 using power supplied by optional energy store 375.

Initially, process controller 340 may scan each power detector 350 and 355 for an active power signal (S410). Process controller 340 may then make the determination if power is present on power detector 355, which monitors power signals coming from independent power supply 115 (S415). If power is present on power detector 355, process controller 340 may source power from independent power supply 115 (S420). This can be accomplished by having process controller 340 send a signal to switching circuit 380 to open and prevent current from flowing from uplink port 320. Process controller 340 may then send another signal to PoE controller 360, which can set a signature resistance on uplink port 320 (in accordance with IEEE 802.3af standards) for signaling closet gigabit switch 210 that gigabit switch 205 does not require any power over the data line through uplink port 320 (S425). Alternatively, if in step S415, power detector 350 signals process controller 340 that power is present on uplink port 320, process controller 340 may send a signal to PoE controller 360 to configure the signature resistance across uplink port 320, so that it will signal closet gigabit switch 210 to allocate and offer power to gigabit switch 205 (S430). The amount of power offered may depend on the value of the signature resistance value presented by PoE controller 360 (which may be based upon IEEE 802.3af standards). Process controller 340 may then source power from the closet gigabit switch 210 over uplink port 320 (S435). This may occur by having process controller 340 signal switching circuit 380 to close, thus allowing current to flow though diode arrangement 385. Independent power supply 115 may be configured so that the two diodes in series with its current supply will be back-biased when power is being supplied through uplink port 320, thus providing a way to economically and effectively block the power being supplied by independent power supply 115.

Although detailed embodiments and implementations of the present invention have been described above, it should be apparent that various modifications are possible without departing from the spirit and scope of the present invention.

What is claimed is:

1. A network apparatus comprising:
a data distribution device having a first input configured to receive data distribution device operating power and data, a second input configured to receive only data distribution device operating power, a first output configured to output external device operating power and data and a second output configured to output data without external device operating power;
a first sensor for determining whether a first power signal is present at said first input;
a second sensor for determining whether a second power signal is present at said second input; and
a controller operably connected to said first sensor and said second sensor,
wherein, when said controller determines that a first power signal is present at said first input and a second power signal is not present at said second input, electrically connecting said first input to said first output,
when said controller determines that a first power signal is not present at said first input and a second power signal is present at said second input, electrically connecting said second input to said first output.

2. The network apparatus according to claim 1, wherein the data distribution device exchanges data with at least one externally powered network device, and exchanges data and power with at least one network device.

3. The network apparatus according to claim 2, wherein the data distribution device provides feedback to a remote data distribution device regarding an amount of power to allocate and/or offer to the data distribution device.

4. The network apparatus according to claim 3, wherein the data distribution device may operate with the remote data distribution device in any Power over Ethernet (PoE) configuration, including endspan and midspan configurations, and provides a first power signature to the remote data distribution device.

5. The network apparatus according claim 4, wherein the data distribution device receives a second power signature from the network device which provides information regarding how much power the network device requires, wherein this second power signature is different from the first power signature.

6. The network apparatus according to claim 2, wherein the data distribution device is operative to provide a power signature to an endspan or midspan remote data distribution device which is different that a power signature which is provided by the network device.

7. The network apparatus according to claim 2, wherein no power is provided by the data distribution device to the at least one externally powered network device.

8. The network apparatus according to claim 1, wherein the data distribution device is a switch, a hub, router, or a patch panel.

9. The network apparatus according to claim 1, wherein the at least one network device includes a Voice over Internet Protocol (VoIP) telephone, a camera, a wireless access point, and/or a remote telemetry data collection device.

10. The network apparatus according to claim 1, wherein the externally powered network devices includes a personal computer, a router, and/or a switch.

11. The network apparatus according to claim 1, wherein the data distribution device is a Gigabit Ethernet device.

12. A network switch configured to interface with a Voice over Internet Protocol (VoIP) telephone, comprising:
    a first circuit which exchanges data and receives power from a remote data distribution device;
    a second circuit which exchanges data and supplies power to the VoIP telephone;
    a third circuit which exchanges data with a networked based device;
    a power switching circuit which receives power from an external power supply and from the first circuit;
    a sensor detecting whether power is being supplied by the external power supply; and
    a process controller, functionally coupled to the power switching circuit, which instructs the power switching circuit to select power from the first circuit when no power is supplied from the external power supply.

13. The network switch according to claim 12, further comprising:
    a Power over Ethernet (PoE) controller, operably coupled to the external power supply and the first circuit, which provides feedback, through the first circuit, to the remote data distribution device regarding how much power to supply.

14. The network switch according to claim 13, further comprising:
    a Power Sourcing Equipment (PSE) controller and power controller, coupled to the PoE controller, which determines how much power is required for the VoIP telephone over the second circuit.

15. The network switch according to claim 12, wherein the third circuit replaces an internal switch located in the VoIP telephone, and further wherein the third circuit exchanges data at a faster rate than the internal switch located in the VoIP telephone.

16. The network switch according to claim 12, when the process controller receives a signal from the sensor indicating that power is being supplied by the external power supply, the process controller instructs the power switching circuit to establish a connection to the external power supply and open circuit a power connection to the remote data distribution device.

17. The network switch according to claim 12, wherein the process controller sources power from the remote data distribution device when no power is being supplied by the external power supply, and sources power from the external power supply when no power is being received from the remote data distribution device.

18. The network switch according to claim 12, wherein the networked based device is a personal computer, a wireless access point, a video camera, or a data collection device.

19. The network switch according to claim 12, wherein the remote data distribution device is closet Gigabit Ethernet switch supplying power using Power over Ethernet (IEEE 801.3af) in any allowed configuration.

20. The network switch according to claim 12, wherein the external power supply is a battery, or a power supply which converts AC power into DC power.

21. A method for selecting a power source for a network switch, comprising:
    scanning a plurality of sensors, each coupled to one of a plurality of power inputs, to ascertain if a power signal is present;
    determining whether a power signal associated with an external power supply is present at a first one of the plurality of power inputs;
    sourcing power from the external power supply if the power signal associated with the external power supply is detected; and
    sourcing power from an alternative power supply if the power signal associated with the external power supply is not detected.

22. The method according to claim 21, wherein the alternative power supply is a switch which provides power in conjunction with a data signal.

23. The method according to claim 21, further comprising:
    providing feedback to the alternative power supply as to whether power is required, based upon the determining.

24. The method according to claim 21, further comprising:
    providing power to a downstream networked device functionally coupled to the network switch.

25. An adapter interface for connecting a network device to a midspan or endspan product, comprising:
    a power over Ethernet (PoE) controller generating a first power signature for transmission to the midspan or endspan product, wherein the first power signature represents a request for a first power level and does not depend upon the value or presence of any other power signature request received by the adapter interface from the network device.

26. The adapter interface of claim 25, wherein the network device is a telephone, and further wherein the telephone sends a second power signature transmission to the adapter interface representing a request for a second power level, and the interface adapter sends the first power signature representing a request for the first power level, which is different than the second power level.

27. The adapter interface according to claim 25 wherein said device is a telephone, and wherein the telephone sends no power signature transmission to said adapter interface, and the interface adapter sends the first power signature representing a request for the first power level.

28. The adaptor interface according to claim 25, wherein said first power signature represents a class 2 power consuming device or a class 3 power consuming device.

29. An adapter interface for connecting at least two devices to an endspan or midspan product comprising:
    a Power over Ethernet (PoE) controller generating a first power signature for transmission to the endspan or midspan product, wherein the first power signature represents a request for a first power level;
    a first port for providing power to a first device of the at least two devices; and
    a second port for providing a communication path but not power to a second device of the at least two devices.

30. The adapter interface according to claim 29, wherein the first port also provides a communication path to the first device.

* * * * *